INVENTOR.
Roland A. Lynn
BY [signature]
ATTORNEY.

INVENTOR.
Roland A. Lynn
BY [signature]
ATTORNEY.

United States Patent Office 2,807,676 Patented Sept. 24, 1957

2,807,676

MAGNETIC HEAD ASSEMBLIES

Roland A. Lynn, Teaneck, N. J., assignor to Radio Corporation of America, a corporation of Delaware Application July 16, 1954, Serial No. 443,821

9 Claims. (Cl. 179—100.2)

This invention relates to magnetic recording and reproducing heads, and particularly to an assembly of a plurality of independent magnetic recording and reproducing heads which have a small dimension along the length of the gaps of the heads.

With the advent of magnetic recording on magnetic tape and film, the recording of a plurality of parallel tracks became desirable, the tracks being recorded either separately or simultaneously. To provide a large number of tracks transversely of a narrow magnetic tape, the heads must be closely spaced, and there should be no interaction or crosstalk between them. Such heads lend themselves to recording binary legends, to recording airport dispatch messages and to recording electronic computer information. These head assemblies may also be used for recording various sound tracks in directional and stereophonic sound systems and in television video recording systems. By rotating the assemblies at an angle to the direction of travel of the magnetic tape or film, the sound tracks may be placed on the tape or film within narrower limits.

The principal object of the invention, therefore, is to facilitate the recording and reproduction of multiple magnetic tracks.

Another object of the invention is to provide an improved magnetic head assembly construction whereby the maximum number of magnetic heads of predetermined characteristics can be accommodated within a definite space.

A further object of the invention is to provide a magnetic head assembly whereby the heads have cores of different sizes to permit the nesting of the magnetic coils of the heads.

The novel features which are believed to be characteristic of this invention, both as to the manner of its organization and the mode of its operation, will be better understood from the following description, when read in conjunction with the accompanying drawings, in which.

Figure 5:
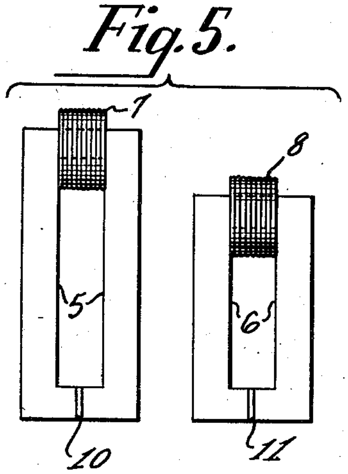
Fig. 5 is a view of two of the type of individual head units used in the assembly shown in Fig. 1.

Referring now to the drawings in which the same numerals identify like elements, and particularly to Fig. 5, individual magnetic head units are composed of rectangular closed cores 5 and 6, having leg portions and cross portions and respective magnetizing or pickup coils 7 and 8 on the rear cross portions thereof. Recording or reproducing gaps are shown at 10 and 11 formed in the front cross portions, it being understood that rear gaps under the coils 7 and 8 may or may not be provided. It is to be noted that the units shown in Fig. 5 are identical except for the length of the leg portions of the cores 5 and 6.

Figure 1:
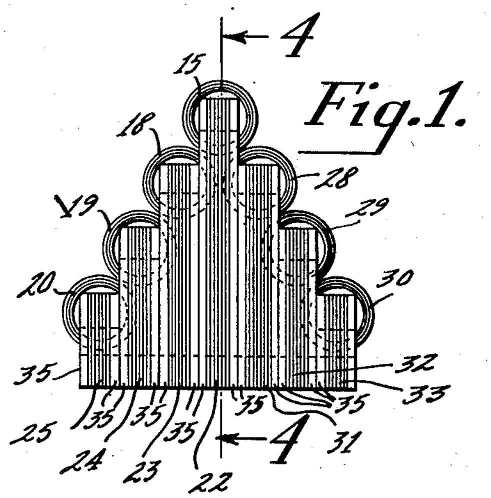
Fig. 1 is a side view of a magnetic head assembly embodying the invention.
Figure 2:
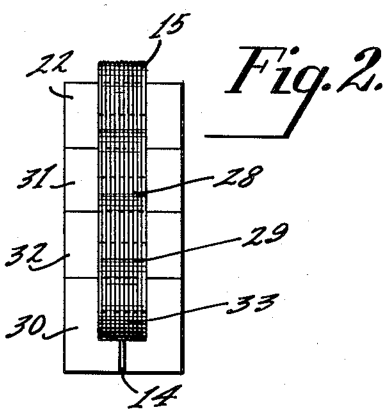
Fig. 2 is an end view of the magnetic head assembly shown in Fig. 1.
Figure 3:
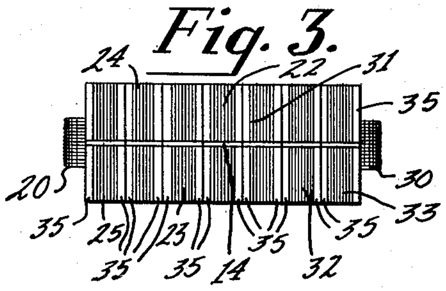
Fig. 3 is a bottom view of the magnetic head assembly shown in Fig. 1.
Figure 4:
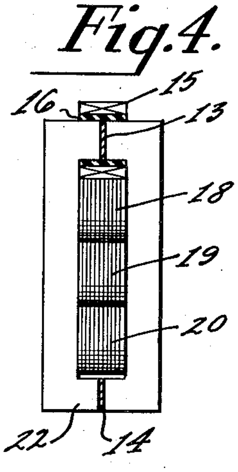
Fig. 4 is a cross sectional view of the magnetic head assembly taken along line 4—4 of Fig. 1.

Fig. 4 is a cross section of the assembly shown in Fig. 1, Fig. 4 showing a magnetizing coil 15 in cross section with an electrical insulator 16 for preventing the short circuiting of any electrical circuit. Furthermore, the three coils 18, 19, and 20, of three other heads of Fig. 1, are visible between the legs of the core 22. A rear gap 13 is also illustrated.

Referring to Fig. 1, seven cores and coils are shown assembled, coil 18 having its core 23, coil 19 its core 24, and coil 20 its core 25. A similar arrangement of coils 28, 29, and 30, with their respective cores 31, 32, and 33 are shown in Fig. 1. Thus, the assembly shown in Figs. 1 to 4, inclusive, includes two outer core heads 20—25 and 30—33 having short leg portions, two adjacent core heads 19—24 and 29—32 having longer leg portions, two adjacent core heads 18—23 and 28—31 having still longer leg portions, and a central head 15—22 having the longest leg portions. The cores are laminated, as shown, and separated by magnetic insulating or isolating material, such as brass or fibre paper strips 35 and are of sizes according to the length of the respective cores.

Figure 9:
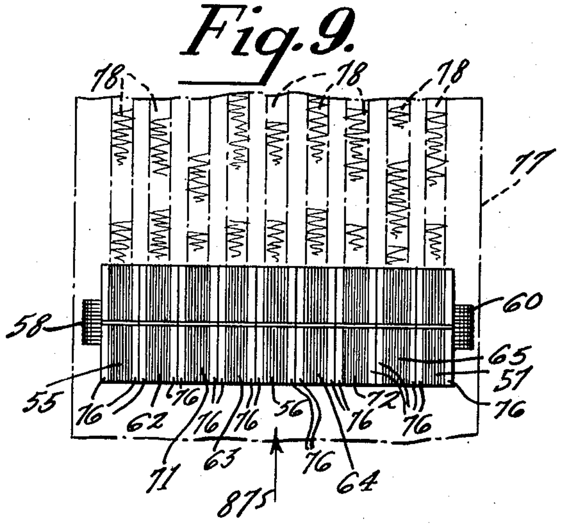
Fig. 9 is a bottom view of the magnetic head assembly shown in Fig. 8 in association with a magnetic medium.

The close spacing of the cores is obtained by varying the lengths of the leg portions of the cores, which permits the coils of adjacent heads to be partially positioned within the spaces between the adjacent core legs. Thus, depending on the recording and detecting characteristics to be obtained from each separate head, which determines the general size of the cores and coils, a maximum number of heads may be placed within a certain dimension. In this manner, a large number of magnetic tracks may be recorded side by side as shown in Fig. 9. It is to be noted that the gaps of all the heads are in alignment with the gap 14.

Figure 6:
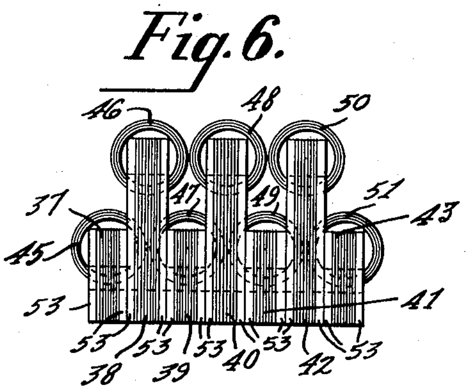
Fig. 6 is a side view of a modification of the magnetic head assembly of Fig. 1 embodying the invention.
Figure 7:
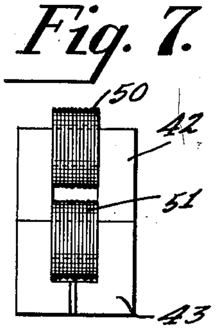
Fig. 7 is an end view of the magnetic head assembly shown in Fig. 6.

Referring now to Fig. 6, a group of seven cores, 37, 38, 39, 40, 41, 42, and 43, are arranged with their respective coils, 45, 46, 47, 48, 49, 50, and 51, in a different staggered pattern. Alternate cores 37, 39, 41, and 43 are of the same size and shorter than the cores 38, 40, and 42, which are of the same size. The cores are separated by magnetic isolating or insulating material 53. By this arrangement of cores and coils, the same compactness of the assembly is obtainable.

Figure 8:
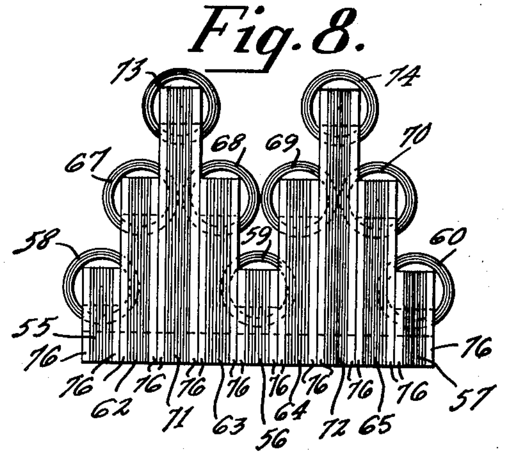
Fig. 8 is another modification of a magnetic head assembly embodying the invention.

Referring now to Fig. 8, an arrangement of nine heads is illustrated, this pattern combining the configuration of the heads shown in Fig. 1 with the configuration of heads shown in Fig. 6. That is, three cores, 55, 56, and 57 are all of the same size and the shortest of the group, these cores having respective coils 58, 59, and 60. The next adjacent cores 62, 63, 64, and 65, are also of the same size but larger than the cores 55, 56, and 57. The latter group of cores have respective coils 67, 68, 69, and 70. The largest cores are 71 and 72, having respective coils 73 and 74. Magnetic insulating or isolating strips are provided at 76. The bottom view of the assembly shown in Fig. 8 is shown in Fig. 9 in association with a magnetic medium shown in phantom lines 77. For the purpose of explanation, the sound tracks produced by these heads are shown at 78, the direction of motion of the medium being shown by arrow 87. Thus, the assemblies shown in Figs. 1 and 6 provide for seven magnetic heads, while the assembly shown in Fig. 8 provides for nine magnetic heads. It is realized, of course, that additional heads may be arranged in the same manner if desired in all three forms of the assemblies.

Figure 10:
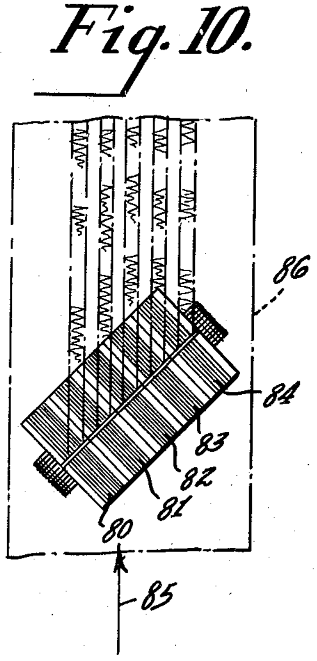
Fig. 10 is a bottom view of a five magnetic head assembly in association with a magnetic medium.

To illustrate how sound tracks may be more closely positioned across the magnetic medium with the above described assemblies, a bottom view of a 5-head assembly having cores 80, 81, 82, 83, and 84 is shown in Fig. 10. This assembly has been rotated so that the gaps have an angle less than 90° to the direction of film motion, as shown by the arrow 85. The more acute the angle of the aligned gaps to the direction of film motion, the closer the tracks are positioned on the medium, as shown at 86 in phantom lines.

Although certain of the individual heads vary in size, particularly the cores thereof, any variations in inductances because of core sizes will be negligible in effect because the reluctance of a core is very low in relation to its gap reluctance. However, if it is desired to compensate for any inductance variations, this can be accomplished by using more turns on the coils having the smaller cores. Thus, by arranging cores having legs of different lengths, which permits portions of the coils thereof to be placed between the core legs of adjacent heads, an extremely compact multiple magnetic head assembly is provided.

I claim:

1. A plural magnetic head assembly, comprising a plurality of closed cores having leg portions thereof of different lengths with gaps in alignment, and a magnetizing coil for each head positioned on the rear cross portions of said cores so that each of said coils has a portion thereof positioned between the first mentioned leg portions of adjacent cores.

2. A plural magnetic head assembly in accordance with claim 1, in which the cores are in pyramidal arrangement, the core with the longest leg portions being the central core, and the cores with the shortest leg portions being positioned at the ends of said assembly.

3. A plural magnetic head assembly in accordance with claim 1, in which a group of longer leg cores are alternately positioned between a group of shorter leg cores, the coils of said shorter leg cores having portions thereof between said first mentioned portions of said longer leg cores.

4. A plural magnetic head assembly in accordance with claim 1, in which a group of pyramidal cores are combined in a serial order.

5. An assembly of a plurality of magnetic heads comprising a plurality of rectangular cores having the long leg portions thereof of different lengths, a coil on the rear cross portion of each of said cores, a gap in the front cross portion of each of said cores, said gaps being aligned, and magnetic isolating material between said cores, said cores and isolating material being in contact, and a portion of each of said coils being disposed between the long leg portions of adjacent cores.

6. An assembly in accordance with claim 5, in which said cores having the shortest leg portions are at the ends of said assembly, and the cores of increasing lengths being disposed between said cores having the shortest leg portions.

7. An assembly in accordance with claim 5, in which the core having the longest leg portions is centrally disposed with respect to said other cores.

8. An assembly in accordance with claim 5, in which a group of said cores having leg portions of the same length are alternately disposed between cores having leg portions of other lengths.

9. An assembly in accordance with claim 8, in which a plurality of groups of said cores of other lengths are alternately disposed between said just mentioned group of cores.

No references cited.